L. M. HECKART.
SEED PLANTER.
APPLICATION FILED FEB. 24, 1914.
1,159,584.
Patented Nov. 9, 1915.
2 SHEETS—SHEET 1.
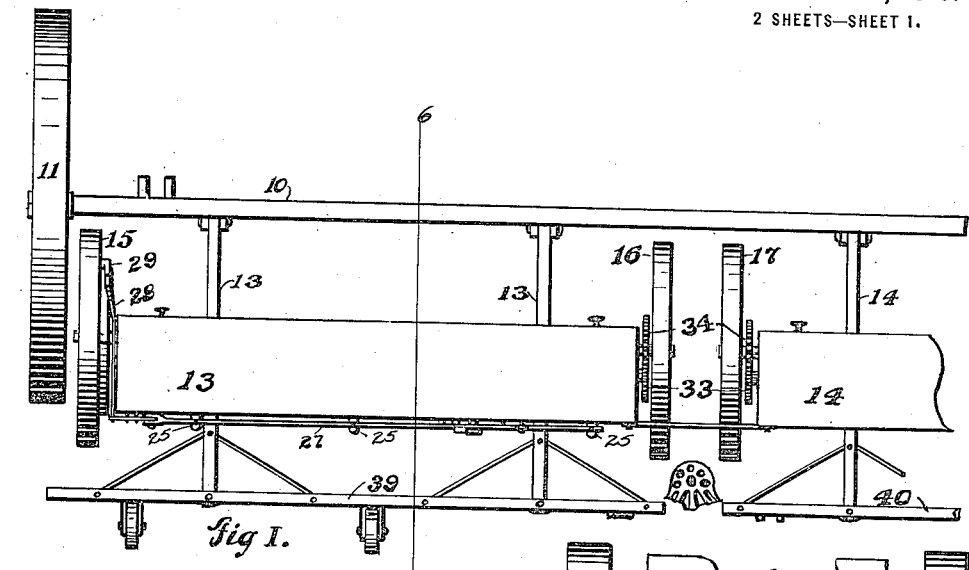
Fig. I.
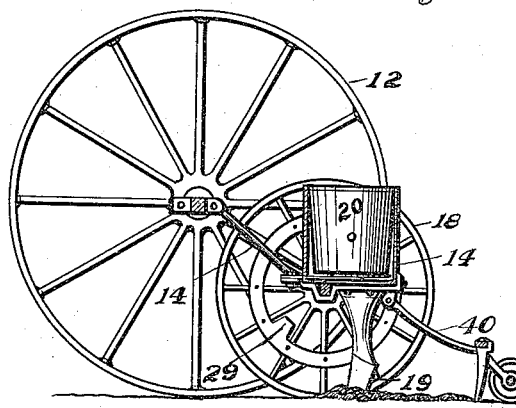
Fig. VI.
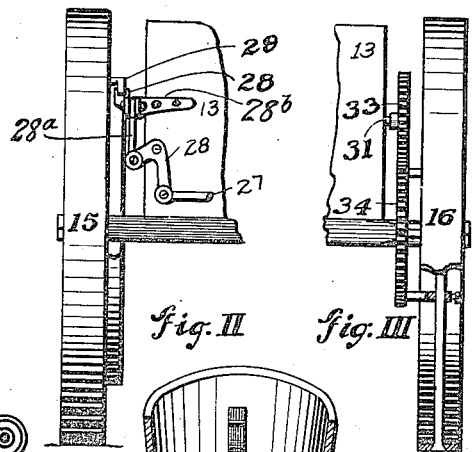
Fig. II.   Fig. III.
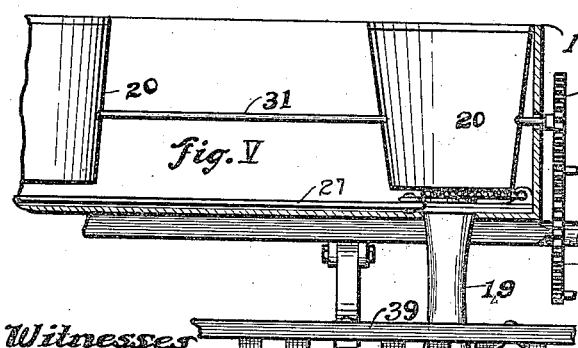
Fig. V.
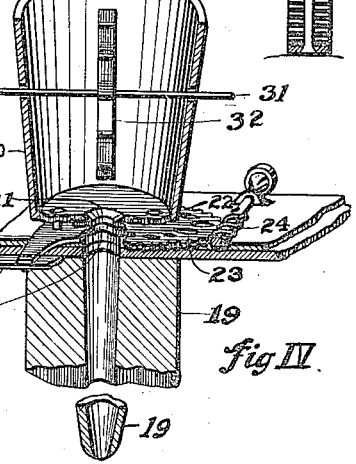
Fig. IV.
Witnesses
L. M. Collins.
Lizzie Heckart
Inventor
LILLY M. HECKART
By Jell J. Roe
Attorney.

L. M. HECKART.
SEED PLANTER.
APPLICATION FILED FEB. 24, 1914.
1,159,584.
Patented Nov. 9, 1915.
2 SHEETS—SHEET 2.
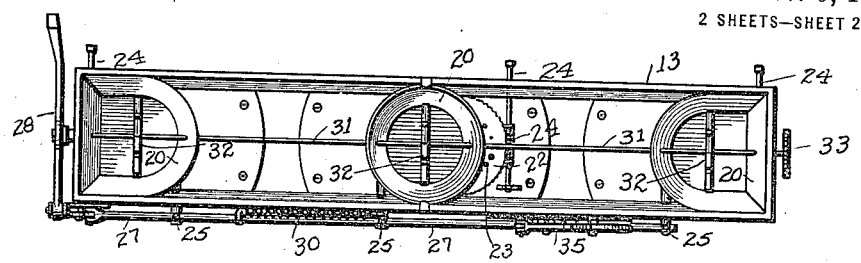
Fig. VII.
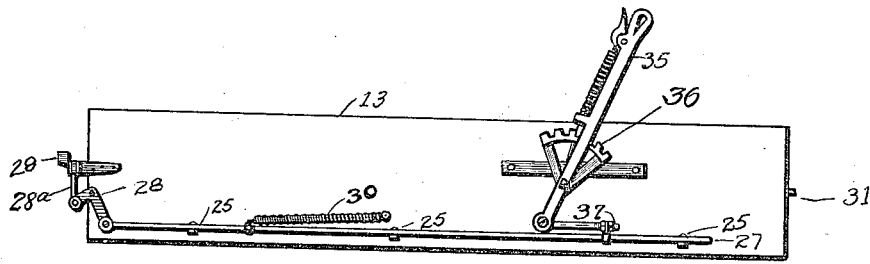
Fig. VIII.
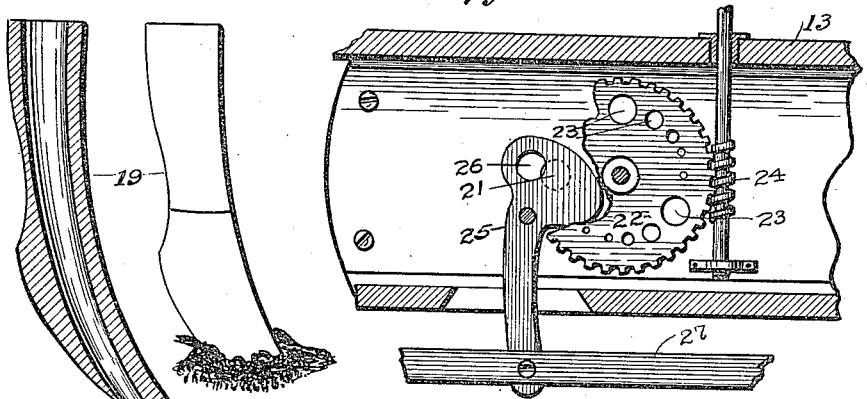
Fig. XII. Fig. XI. Fig. IX.
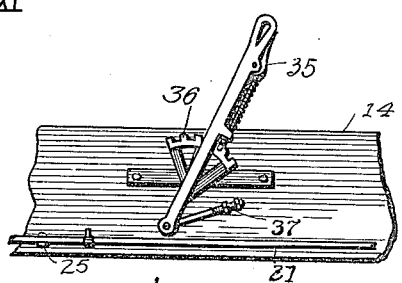
Fig. X.
Witnesses.
L. M. Collins
Lizzie Henning
Inventor.
LILLY M. HECKART.
By Jell & Roe
Attorney.

UNITED STATES PATENT OFFICE.

LILLY M. HECKART, OF FORT DES MOINES, IOWA.

SEED-PLANTER.

1,159,584. Specification of Letters Patent. Patented Nov. 9, 1915.

Application filed February 24, 1914. Serial No. 820,431.

*To all whom it may concern:*

Be it known that I, LILLY M. HECKART, a citizen of the United States, residing in Fort Des Moines, county of Polk, and State of Iowa, have invented a new and useful Improvement in Seed-Planters, of which the following is a specification.

The object of my invention is to provide a drill and seed planter adapted for use in planting seed of any size either by a continuous running of the seed into the ground or by planting the same at regular, measured intervals as is desirable in corn planting, or planting seeds in hills.

A further object is to provide such a device adapted for gardening use as well as in the fields.

My invention consists of certain details of construction hereinafter set forth, pointed out in my claims, and illustrated in the accompanying drawings, in which—

Figure I shows a plan view of one complete side of my seed planter and a portion of the other section thereof; Fig. II shows a detail view of the tripping levers I employ; Fig. III shows a detail view of the gearing I employ to rotate the rod which operates the stirrers; Fig. IV shows a sectional view, in perspective of one of the seed boxes I employ and its relation to the seed dropping plates and the hollowed drill; Fig. V shows a rear elevation view of a part of my device, the frame containing the seed boxes and dropping plates being in section; Fig. VI shows a sectional view taken on the line 6—6 in Fig. I; Fig. VII shows a plan view of the frame supporting the seed boxes, showing the seed boxes, seed plates, stirrer shafts, and stirrers in position; Fig. VIII shows a side elevation view of the frame containing the seed boxes, particularly showing a ratchet lever and rack with an arm secured to the said lever and connected to the operating rod for the reciprocating cut offs; Fig. IX shows a detail view, in plan, of one of the seed plates I employ and the means for rotating same; Fig. X shows an additional view of a part of the seed containing frame, ratchet lever and rack with the arm of the ratchet lever detached from the operating rod for the cut offs; Fig. XI shows a detail view of one of the drills which I employ; Fig. XII shows a sectional view of the same.

Referring to the accompanying drawings the reference numeral 10 is used to indicate the truck, or frame, of my device, mounted on wheels 11 and 12.

The numerals 13 and 14 indicate frames connected to the truck, one on either side of the center thereof, said frames supported by wheels 15 and 16, and 17 and 18, respectively, on which they travel. Rigidly secured to said frames 13 and 14, and depending therefrom is a plurality of hollow drills 19, the channel in said drills being designed to permit the passage of seed therethrough into the ground. Obviously an orifice is provided in the frames 13 and 14 in line with the channel in each of the drills. Above each of said orifices in the said frames is mounted a seed containing box 20, with an orifice 21 in the base thereof, in line with the orifice in the frame. Between said seed containing boxes and the frame I have interposed a seed plate 22, provided near its periphery with a plurality of different sized orifices, 23, all at equal distances from the center, at which point the plate is pivotally secured, for rotation, in the base of the seed box. The orifices are so arranged that by rotation of the plate any sized orifice may be brought in line with the orifice 21 in the base. The rotation is accomplished by a worm gear 24 secured for rotation, manually, on the upper surface of the base of the frame, operating on a gear provided on the periphery of the plate as clearly shown in Fig. IV. Beneath said plate 22 and above the base of the frames 13 and 14, respectively, is rotatably secured a reciprocating cut off plate 25, an orifice 26 therein being designed to be brought in line, intermittently, with the orifices in the seed box, the plate 22 and the orifice in the frame. The said cut off plates are pivotally secured, as shown in Fig. IV, in the base of the seed box and lugs projecting outwardly from said plates are loosely connected to a sliding lever 27 so that all the cut off plates are simultaneously operated. The lever 27 is mounted longitudinally of the frames 13 and 14, respectively, and one of its ends is pivotally connected with a bell crank on the frame designed to be tripped to move the rod, by lugs 29 secured on the inner surface of the wheels 16 and 18, respectively, which engage said lugs as the said wheels revolve, said bell crank 28 having connection with a member 28ª pivoted in a bracket or casting 28ᵇ on the frame, through which the action of the lugs on the wheel is transmitted to the bell crank. A coil spring 30, mounted as shown, is used to return the lever 27, and its cut off plates, to their normal positions, which is with the solid part of the cut off plates in line with the orifices in the seed box and the seed plate, thus obviously closing the channel between the said seed box and through the hollow drills to the ground.

A shaft 31 extends longitudinally across the frames 13 and 14, passing centrally through each seed box, and secured on said shaft, within each seed box is a stirrer 32. A gear wheel 33 is secured on one end of each of said shafts, and is designed to mesh with, and be driven by, a gear wheel 34 which is secured to the wheels 16 and 17, respectively, in the manner shown in Fig. III. Obviously the stirrers will be operated by the travel of the truck.

I have provided on the frames 13 and 14 a ratchet lever 35 and rack 36, with an arm 37 which may be secured to the lever 27. By setting the lever 35 in the rack the lever 27 may be retained against the compression of the spring 30, and when in this position the arm on the lever 27 would not come into contact with the lugs on the wheels 16 and 17, and the orifice in the cut off plates would be in line with the orifices in the seed box and the seed plates, thus providing a continuous channel from the seed boxes through the seed plates, cut off plates, base of the frames 13 and 14, respectively, and the respective hollow drills to the ground. When desired my seed planter is so operated, by the connecting of the arm 37 to the lever 27. It is obvious that when the arm is connected to the lever the said lever may be set at any desired point by the movement of the ratchet lever in the rack. However, the normal position of these parts is such that the arm 37 is not connected with the lever 27, thus leaving the lever free to be operated by the lugs on the wheels of the seed containing frame in the manner hereinbefore described. Secured to each frame 13 and 14, and behind them so as to follow, I have provided the harrow sections 39 and 40, respectively, each traveling on its own individual wheels, as shown in Fig. XI.

Having thus described my invention what I claim and desire to secure by Letters Patent of the United States is:

1. In a seed planter a frame mounted on a wheel truck; a plurality of seed holders on said frame and an orifice in the base of each holder; a hollow drill depending from each holder, the hollow portion forming, with the aforesaid orifice, a continuous channel to the ground; a trip plate, rotatably mounted, interposed between each holder and its drill and an orifice in each plate in radial alinement with the orifice in the holder; a spring actuated lever extending longitudinally of the frame and secured to each trip plate; an arm on the end of said lever; lugs on the inner surface of one of the wheels of the truck designed to engage, as the wheel rotates, the arm of the spring actuated lever and thereby operate same; means to hold the trip plates out of operative position with the holders, substantially as shown and described.

2. A seed planter comprising a wheeled frame, a seed box mounted thereon and formed with an orifice in its bottom, a drill having its opening forming a continuation of the box orifice, a rotatable seed plate arranged between the drill and the box and provided with a series of varying sized openings adapted to be brought in coincidence with the orifice of the seed box, a cut off plate pivotally disposed between the drill and the seed plate and adapted to close communication between the drill and the seed box, means for rotating the seed plate, and other means for operating the cut off plate.

3. A seed planter comprising a wheeled frame, a seed box thereon, a drill, a cut-off interposed between the box and drill, a spring retracted lever connected to the cut-off for operating the latter, trip means operable by the rotation of a wheel operating the lever against the action of its spring, and a mechanism for rendering the cut-off and trip means inoperative comprising a lever, an associated quadrant, and a detachable connection between the first and second levers.

LILLY M. HECKART.

Witnesses:
ZELL G. ROER,
FRANK STEINER.